US011021209B2

(12) United States Patent
Golesh et al.

(10) Patent No.: US 11,021,209 B2
(45) Date of Patent: Jun. 1, 2021

(54) PEDAL WITH DETACHABLE SHOE PLATFORM AND ADJUSTABLE TOE CLIP

(71) Applicant: Foundation Fitness, LLC, Portland, OR (US)

(72) Inventors: Eric D. Golesh, Arvada, CO (US); Patrick A. Warner, Boulder, CO (US); Jeffrey G. Stein, Weimar, CA (US)

(73) Assignee: Foundation Fitness LLC, Portland, OR (US)

( * ) Notice: Subject to any disclaimer, the term of this patent is extended or adjusted under 35 U.S.C. 154(b) by 59 days.

(21) Appl. No.: 16/103,794

(22) Filed: Aug. 14, 2018

(65) Prior Publication Data

US 2019/0054977 A1   Feb. 21, 2019

Related U.S. Application Data

(60) Provisional application No. 62/545,810, filed on Aug. 15, 2017, provisional application No. 62/644,168, filed on Mar. 16, 2018.

(51) Int. Cl.
*B62M 3/08* (2006.01)

(52) U.S. Cl.
CPC ............ *B62M 3/083* (2013.01); *B62M 3/086* (2013.01); *Y10T 74/217* (2015.01)

(58) Field of Classification Search
CPC ........ B62M 3/083; B62M 3/086; B62M 3/08; B62M 3/10; B62M 3/16; Y10T 74/217; A43B 5/14
See application file for complete search history.

(56) References Cited

U.S. PATENT DOCUMENTS 4,327,602 A * 5/1982 Le Bee ................. B62M 3/083
74/594.6
4,442,732 A * 4/1984 Okajima ............... B62M 3/083
74/594.5

(Continued)

FOREIGN PATENT DOCUMENTS

DE       3414971 A1    10/1985
FR       2888205 A1    1/2007

(Continued)

OTHER PUBLICATIONS

International Searching Authority, International Search Report and Written Opinion, issued for PCT/US2018/046774, dated Jan. 28, 2019 (15 pages).

*Primary Examiner* — Jeremy R Severson
(74) *Attorney, Agent, or Firm* — Polsinelli PC

(57) ABSTRACT

A pedal that includes a pedal body having a clipless structure and a member. The clipless structure includes a lip at a first portion of the pedal and a cleat at a second portion of the pedal. The pedal includes a detachable shoe platform having a cleat portion securable to the lip and a clip securable to the member. The detachable shoe platform may include an adjustable toe clip having a strap, which wraps around a shoe of a rider. The strap is adjustable by an adjustable strap fastener assembly having a lever coupled to a plate secured in a housing. The lever includes a first end biased against the strap and a second end engaged by a trigger. The trigger is operable to move the lever from a closed position to an open position against the bias force, thereby releasing the strap for adjustment.

24 Claims, 11 Drawing Sheets

(56) References Cited

U.S. PATENT DOCUMENTS

| | | | | |
|---|---|---|---|---|
| 4,638,685 | A * | 1/1987 | Cigolini | B62M 3/083 280/288.4 |
| 4,762,019 | A * | 8/1988 | Beyl | A63C 9/20 74/594.6 |
| 5,097,687 | A * | 3/1992 | Turrin | B62M 3/083 24/535 |
| 5,442,976 | A * | 8/1995 | Cheng | B62M 3/086 36/131 |
| 6,035,743 | A * | 3/2000 | Gapinski | B62M 3/083 36/131 |
| 9,090,309 | B2 * | 7/2015 | Swift | B62M 3/086 |
| 9,493,209 | B2 * | 11/2016 | Sakaue | B62M 3/086 |
| 9,527,549 | B2 * | 12/2016 | Pepito | B62M 3/086 |

FOREIGN PATENT DOCUMENTS

| | | | |
|---|---|---|---|
| NL | 1016158 | C2 | 3/2002 |
| WO | 1989-002625 | A1 | 3/1989 |
| WO | 1999-047987 | A1 | 9/1999 |
| WO | 2019-036515 | A1 | 2/2019 |

* cited by examiner

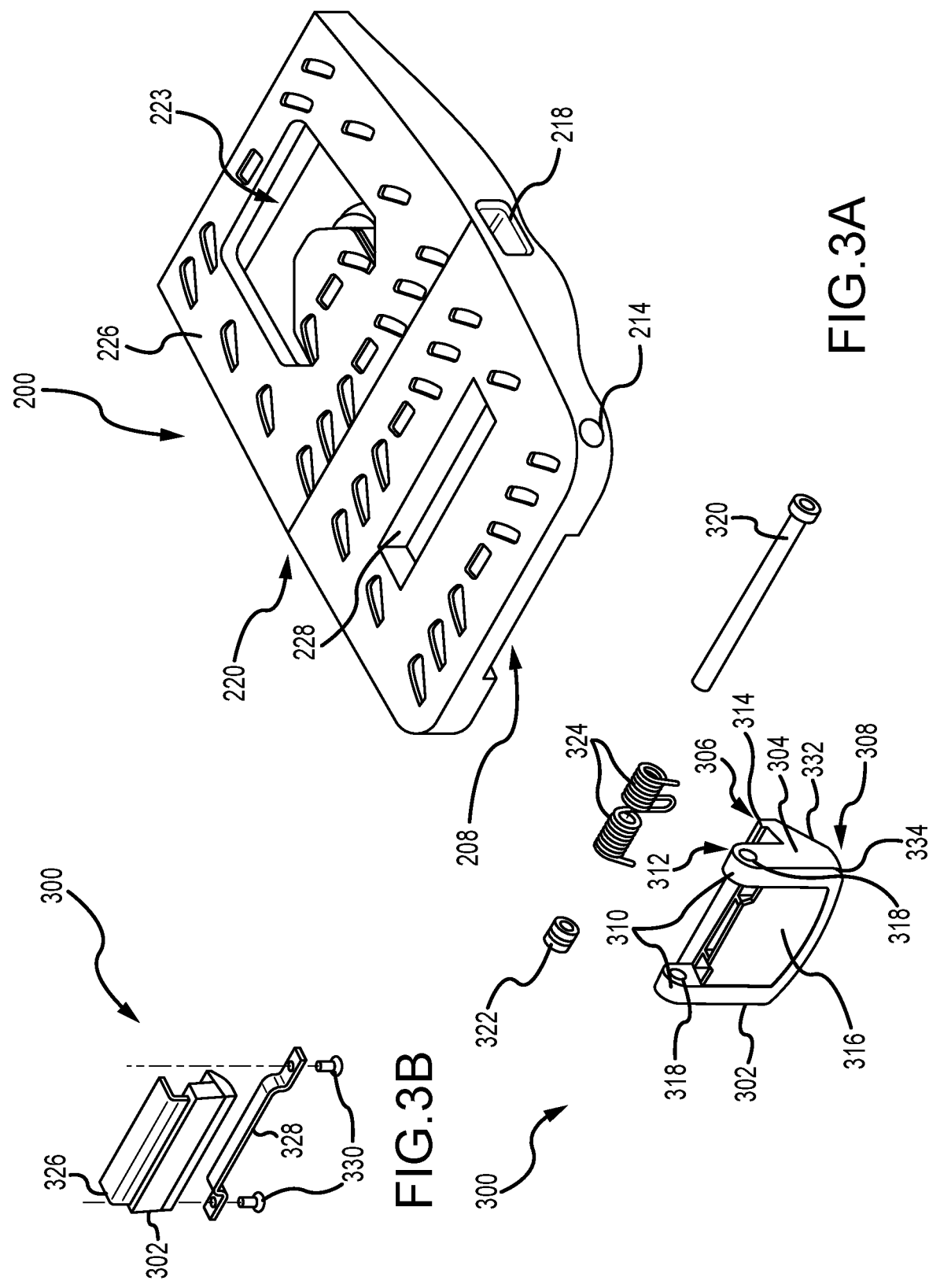

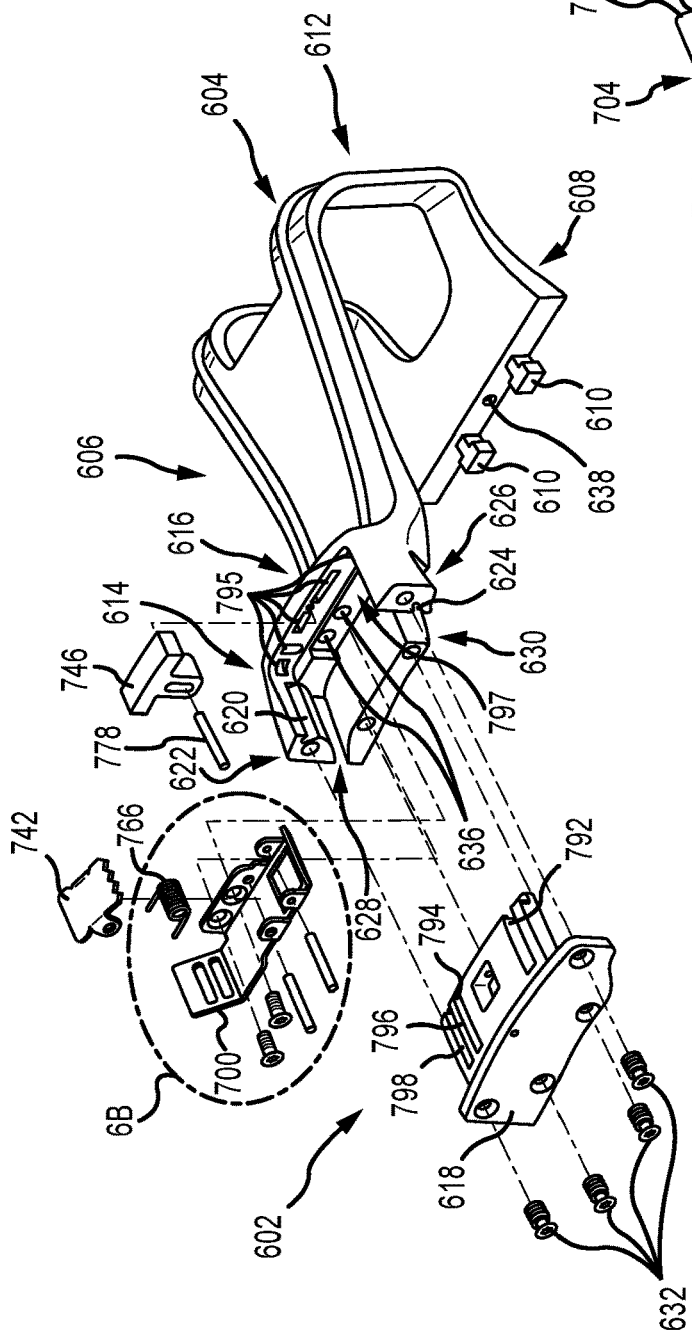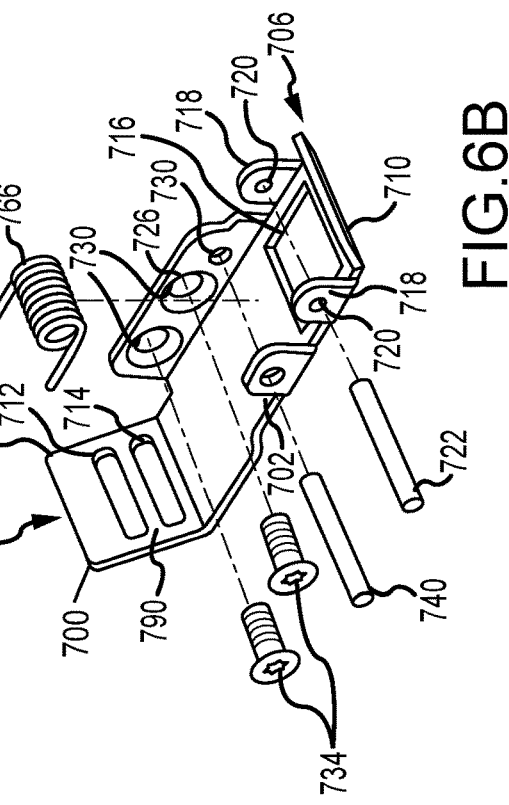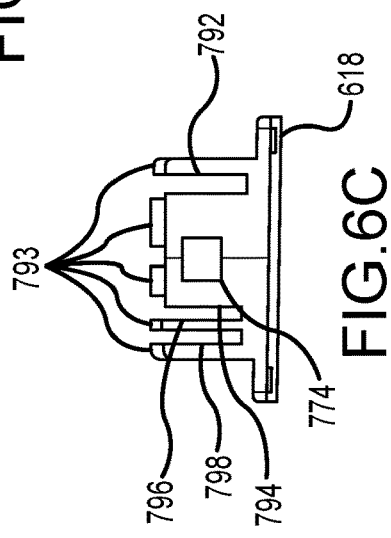

PEDAL WITH DETACHABLE SHOE PLATFORM AND ADJUSTABLE TOE CLIP

CROSS-REFERENCE TO RELATED APPLICATIONS

This application claims priority under 35 U.S.C. § 119 to U.S. Provisional Application No. 62/545,810, titled "DUAL CLEAT PEDAL WITH REMOVABLE SHOE PLATFORM" filed Aug. 15, 2017, and U.S. Provisional Application No. 62/644,168, titled "ADJUSTABLE TOE CLIP APPARATUS" filed Mar. 16, 2018, both of which are incorporated herein by reference in their entirety.

TECHNICAL FIELD

Aspects of the present disclosure involve pedals, and more particularly involve a clipless pedal that receives a cleat from a riding shoe, and where the clipless pedal further includes a structure for securing a detachable platform with an adjustable toe clip for use with a conventional shoe.

BACKGROUND

Outdoor cycling and indoor cycling are popular activities that provide workouts varying from casual to strenuous rides and that are suitable for riders of all levels. Indoor cycling has been widely adopted in club environments where group training sessions may occur. In the club environment, there is a challenge where riders may have different types of riding shoes that involve different types of cleats to engage the pedals, or no cleats at all. The outdoor cycling community faces a similar challenge during events or group rides when demo or rental bikes are provided for riders, where riders may also have different types of riding shoes. Generally speaking, a clipless pedal that accepts a relatively larger cleat is often used in road cycling whereas a clipless pedal that accepts a relatively smaller cleat is often in used in mountain biking. In some instances, the road cycling pedal is colloquially referred to as a "Look" style pedal, which reflects the company Look that was instrumental in the early introduction of the pedal and cleat whereas the mountain biking pedal is colloquially referred to as an "SPD" style pedal, which reflects the SPD pedal technology of Shimano. In either case, there are typically two receptors, one on each side of the pedal, that each can accept the cleat on the bottom of a shoe to engage the pedal. A toe clip, in contrast, is used for shoes without any form of cleat, and a clip/strap combination is used to secure the shoe to the pedal.

U.S. Pat. No. 6,035,743 illustrates one way to address the concerns above by providing a pedal that has a Look style interface on one side, and an SPD style interface on the other, and may accept a platform supporting a strap that locks into place with one of the interfaces for shoes without any form of cleat. Over time, various drawbacks with the '743 pedal have emerged. For example, the pedal platform is held in place by the conventional Look style interface. While effective, it requires a substantial force to twist the platform free from the interface. Moreover, to avoid the platform from inadvertently being dislodged, the '743 technology includes a locking structure, which is effective in locking the platform to the pedal but it requires a unique tool to engage the lock. In a club environment, the tool gets misplaced, or is simply inconvenient for members or trainers to use.

Another challenge associated with indoor and outdoor cycling involves the use of conventional toe clips. Conventional toe clips provide additional power transfer during a pedal stroke by providing a clip which captures a front portion of the rider's shoe and a strap to cinch down the clip onto the shoe. Toe clips help to transfer power through the mid and up-stroke. In the club or outdoor environment, there is a challenge when the rider wishes to adjust the toe clip mid-ride. Generally speaking, the conventional toe clip is typically adjustable by the strap secured to the toe clip on one end, and attached to a ratchet system positioned on a side of the toe clip on the other end. The other end of the strap is pulled through the ratchet system to tighten the strap on the rider's shoe. A free end of the strap for adjustments is typically positioned at or near a bottom portion of the rider's shoe. As such, a rider may have difficulty reaching the strap for adjustments and particularly during active pedaling. The free end may also completely detach from the ratchet system, thereby requiring re-installation of the free end into the ratchet system and/or result in a loose fit.

It is with these ideas in mind, among others, that aspects of the present technology were conceived.

SUMMARY

One implementation provides for a pedal having a first clipless structure on a first side of the pedal body. The pedal may have a second clipless structure on a second side of the pedal body. The first clipless structure includes a lip at a first portion of the pedal and a claw at a second portion of the pedal. The claw may be spring-loaded. The pedal body includes a member (e.g., a cross member). The pedal body may include a channel extending from the member. The channel may be dimensioned to receive the clip, whereby the platform may be constrained from lateral movement relative to the pedal body by the clip secured within the channel and under the member. The pedal includes a platform having a cleat portion and a clip. The cleat portion may be securable under the lip and the clip may be securable to the member. The clip may be spring-loaded (e.g., by a torsion spring mounted on a rod or a leaf spring) to provide a force to secure the clip to the member. The clip may be pivotably secured to the platform by a rod.

The clip may include a hook portion operable to engage the member when the clip is secured to the member. The hook portion may define a hook lip along an outer edge of the hook portion. The hook lip may extend over an inner surface of the member when the hook is secured to the member. The clip may include a bottom portion spaced angularly from the hook lip. The clip may include a sloped surface extending between the hook lip and the bottom portion. The sloped surface may be engaged by the member during assembly of the platform to the pedal and engaged by a rider during disassembly of the platform from the pedal. The bottom portion may include a downward facing surface facing away from the pedal. The downward facing surface may be engaged by a rider during disassembly of the platform from the pedal. The platform may include a claw slot dimensioned to receive the claw when the platform is secured to the pedal.

Another implementation provides for an adjustable toe clip having a base (e.g., a platform securable to a pedal, a pedal, or a platform pedal). The toe clip includes a toe cage coupled to the base. The toe clip may further include an upper portion disposed above the base. The toe clip includes a strap extending between the base and a strap fastener assembly. The strap may form an adjustable portion at an upper portion of the strap fastener assembly. The adjustable portion may be operable to receive an upward force to move the adjustable portion upward and pivot the lever against the bias force, thereby releasing the strap.

The strap fastener assembly may be coupled to the toe cage and include a housing. The strap fastener assembly includes a plate secured in a slot defined in the housing. The strap includes a first end portion secured to the plate. The strap fastener assembly includes a lever coupled to the plate. The lever includes a first end biased against the strap (e.g., by a spring). The strap fastener assembly includes a trigger translationally supported in the housing and positioned to engage the lever to move the lever from a closed position to an open position against the bias force. The trigger may be coupled to the housing via a trigger rod extending from the housing and the trigger rod is received in an opening of the trigger. The trigger may include a first position corresponding to the closed position of the lever and defined by the trigger rod positioned in a lower portion of the opening. The trigger may include a second position corresponding to the open position of the lever defined by the trigger rod positioned in an upper portion of the opening.

Another aspect of the present disclosure involves a pedal comprising a pedal assembly. The pedal assembly includes a pedal body having a first clipless structure on a first side. The pedal body may include a second clipless structure on a second side of the pedal body. The first clipless structure includes a lip at a first portion of the pedal and a claw at a second portion of the pedal. The pedal body further includes a member rearward of the claw. The pedal assembly further includes a platform having a cleat portion and a clip. The cleat portion is securable under the lip and the clip is securable to the member. The platform may include a rod pivotably securing the clip to the platform, and may further include a torsion spring coupled to the rod. The torsion spring may be operable to provide a spring-loaded force to secure the clip to the member. The pedal also comprises an adjustable toe clip coupled to the pedal assembly. The adjustable toe clip comprises a toe cage operable to receive and capture a front portion of a shoe. The adjustable toe clip also includes a strap extending between the platform and a strap fastener assembly. The strap is operable to wrap around the shoe. The strap may form an adjustable portion at an upper portion of the strap fastener assembly. The adjustable portion may be operable to receive an upward force to move the adjustable portion upward and to pivot the lever against the bias thereby releasing the strap. The strap fastener assembly is coupled to the toe cage and includes a lever coupled to a plate secured in a housing. The lever has a first end biased against the strap and a second end engaged by a trigger. The trigger is operable to move the lever from a closed position to an open position against the bias force thereby releasing the strap for adjustment.

These and other aspects are disclosed in further detail in the description set out below.

BRIEF DESCRIPTION OF THE DRAWINGS

FIG. 3A is an exploded view of the clip assembly and an example rear clip assembly shown in FIG. 1;

FIG. 3B is an exploded view of another example rear clip assembly;

DETAILED DESCRIPTION

Figure 1:
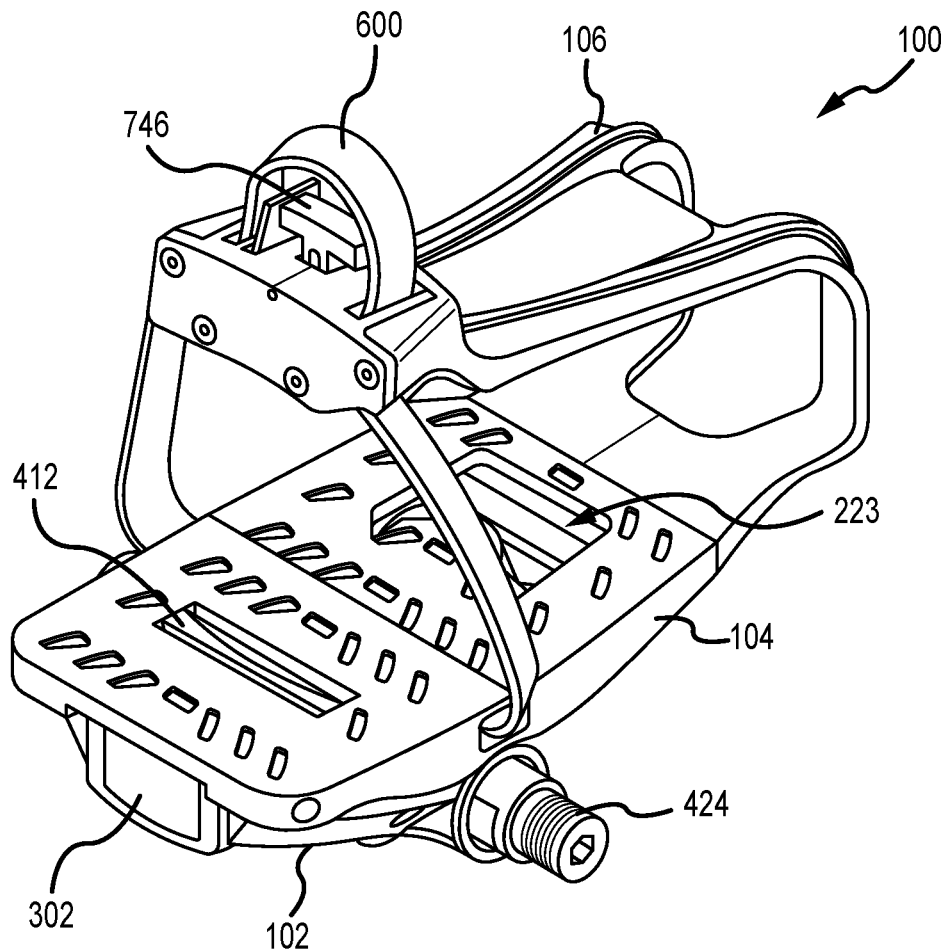
FIG. 1 is an isometric view of a pedal assembly conforming to aspects of the present disclosure.

Aspects of the present disclosure involve a dual-sided clipless pedal 102 and a detachable shoe platform 104 with an adjustable toe clip 106, as shown in FIG. 1. The combination of the pedal 102 and the platform 104 is referred to herein as a pedal assembly 100. The term "clipless" refers to the notion that the pedal 102 does not employ a conventional toe clip or toe basket. Instead, the pedal 102 portion of the overall pedal assembly 100 has clipless structures where a rider may secure a cleat on the bottom of their shoe to the pedal 102. In the illustrated example, the platform 104, in contrast, may include an adjustable toe clip 106 shaped to receive a front portion of the shoe. The platform 104 may be snapped into one of a pair of clipless structures 402, 406, visible in FIG. 4A, similarly to a cleat of a shoe. In another example, the platform 104 may not have the toe clip 106, and would instead provide a simple, flat platform 104 for the rider. A simple platform 104 may be particularly useful for new riders who may prefer to have their shoe free so that they can immediately remove their shoe from the platform 104 and to the ground during a quick or emergency stop.

In general, the pedal 102, as shown in FIGS. 1, 4A-4D, and elsewhere, includes a pedal body 400 having clipless structure 402 on a first side 404 of the pedal body 400. The clipless structure 402 allows the rider wearing a shoe with a cleat to engage and lock the shoe to the pedal 102. During use, the clipless structure 402 transfers power from the rider to the bike during the entire pedal stroke because the shoe is connected to the pedal 102. The pedal 102 may include another clipless structure 406 on a second side 408, opposite the first side 404, of the pedal 102, which may be the same type of clipless structure as described, or a different type of clipless structure. In one example, the clipless structure 402 on the first side 404 is a road style "Look" cleat and the other clipless structure 406 on the second side 408 is a mountain bike style "SPD" cleat, though the clipless structures 402, 406 can be a "Look" style cleat, "SPD" style cleat, or other type of cleat. The pedal 102 may, in alternative embodiments, include the same type of clipless pedal structure on each side of the pedal 102, or various other different clipless structures for receiving different types of cleats. In another example, the pedal 102 may only include one clipless structure, not limited to a Look or SPD style.

Figure 4A:
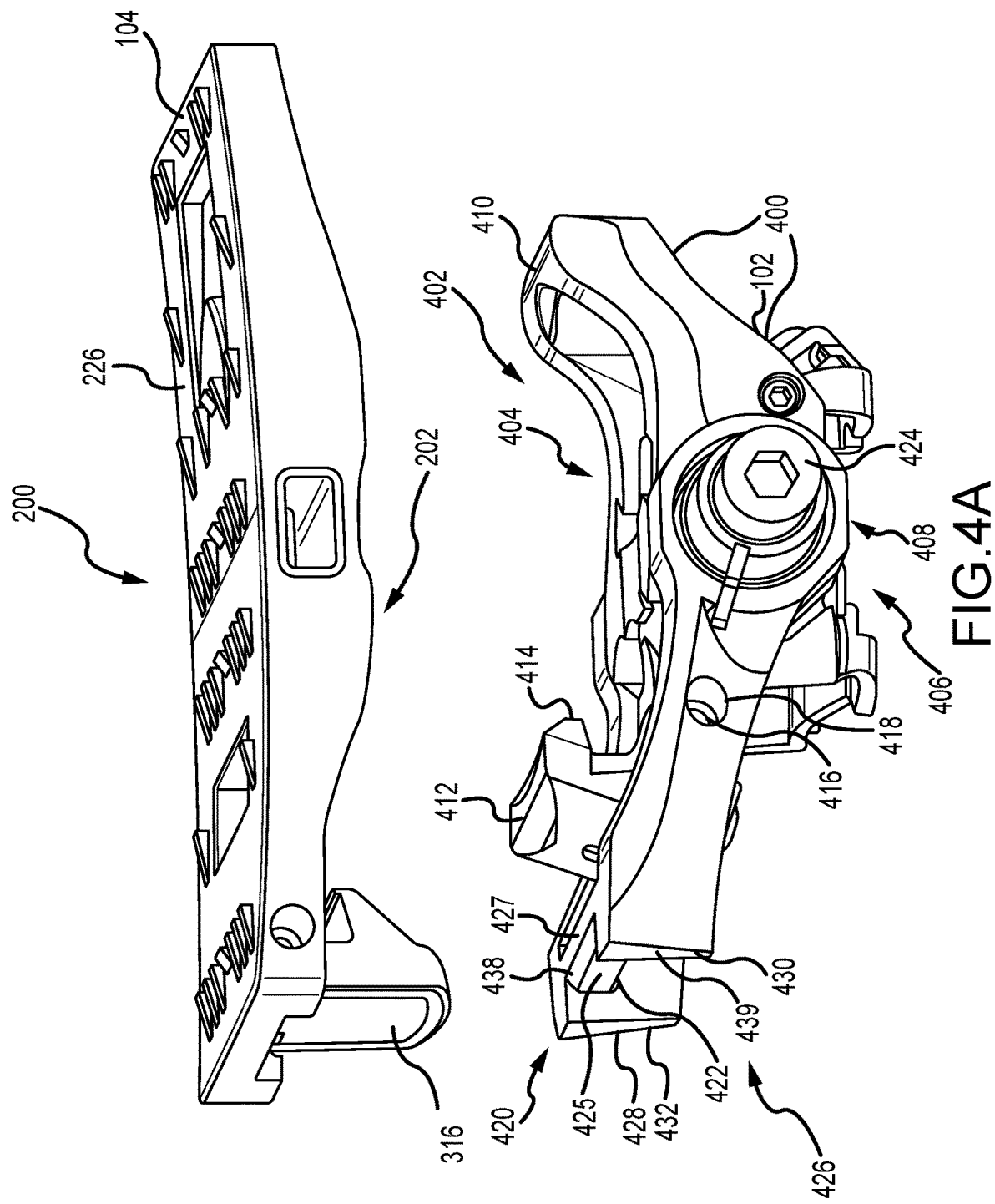
FIG. 4A is an isometric view of the pedal assembly of FIG. 1, with the platform positioned above the pedal prior to locking the platform to the pedal.

Referring to FIG. 4A, in the illustrated embodiment, the clipless structure 402 includes a front lip 410 formed in the pedal body 400. The front lip 410 has an arcuate form, shaped to receive a front portion of the cleat of the rider's shoe or a platform cleat 222 of the platform 104, as will be discussed in detail below. The clipless structure 402 also includes a heel claw 412, which may be spring-loaded, that projects upwardly from within the pedal body 400. The heel claw 412 has a forward facing surface 414 and is pivotally supported about a heel claw axle 416 supported between two opposing and aligned apertures 418 in the pedal body 400. The forward facing surface 414 of the claw 412 is sloped such that when a heel portion of the cleat, constrained by the front lip 410, presses downward on the claw 412, the claw 412 pivots about the claw axle 416 rearwardly to receive the cleat. The cleat, at both the front and rear, defines a flange that restrains the cleat under the front lip 410 and allows the claw 412 to close over the cleat and hold it on the pedal 102.

Figure 5:
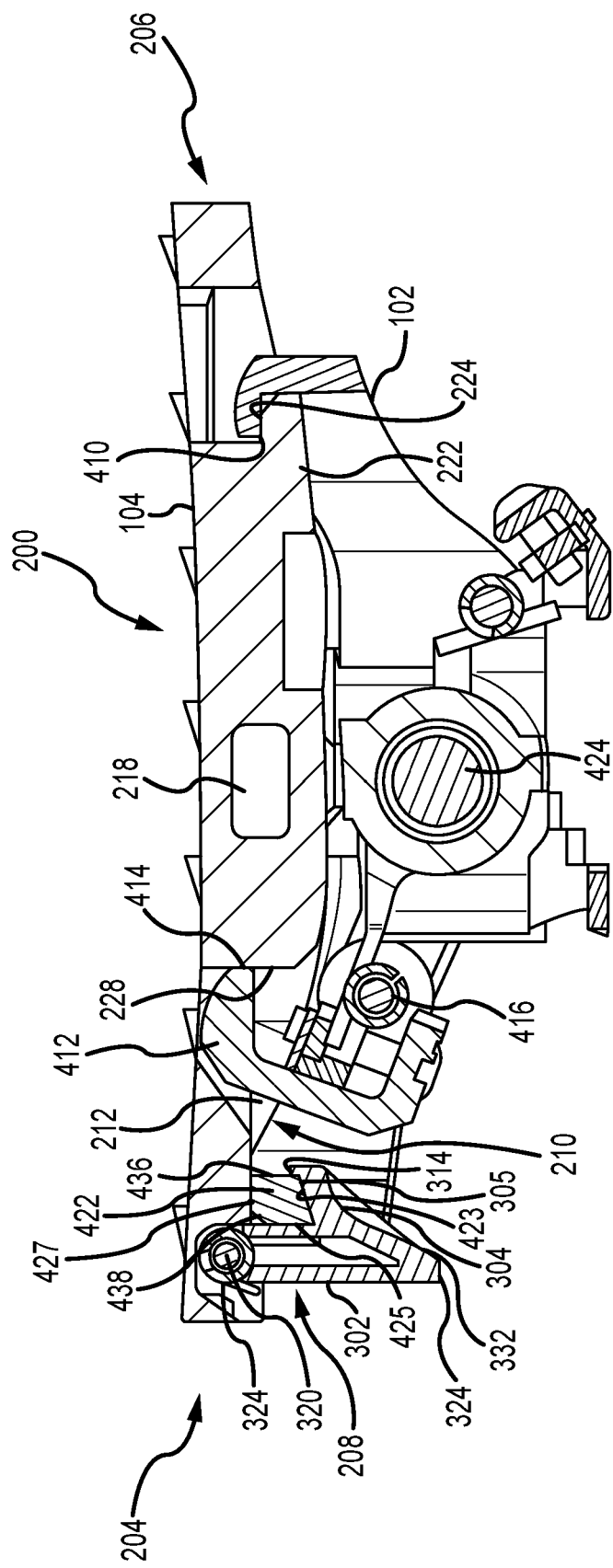
FIG. 5 is a cross section view of the pedal assembly in the configuration of FIG. 4D, FIGS. 6A-6C are an exploded isometric view of a strap fastener assembly of the pedal assembly shown in FIG. 1, a detailed view of a plate of the strap fastener assembly, and a detailed view of a cover of the strap fastener assembly, respectively.

Referring to FIGS. 4A and 5, the pedal 102 also includes a platform retaining structure 420 adjacent and rearward of the heel claw 412. The combination of the clipless structure 402 and the retaining structure 420 provides a structure by which the platform 104 can be secured to the pedal 102. In more detail, the platform retaining structure 420 includes a cross member 422, which is generally parallel with a pedal axle 424 and the heel claw axle 416. The cross member 422 may have a cross section shaped as a square, triangle, oval, circle, hexagon, or any modified shape. In the illustrated embodiment, shown in FIG. 5, the cross member includes a top surface 427 and a lower surface 423, opposite the top surface 427 and sloped upwards. An inner surface 436 is perpendicular to the top surface 427 and opposite and parallel to a rear surface 425. A top, rearward surface 438 is sloped between the top surface 427 and the rear surface 425. During assembly, a rear clip 302 of the platform 104 engages the cross member 422, which secures the platform 104 to the pedal 102, as will be discussed in detail below.

The platform retaining structure 420 further includes a channel 426 immediately rearward of the cross member 422 and between a first channel member 428 and a second channel member 430, each extending rearwardly from the cross member 422. The channel 426 receives the rear clip 302 during assembly, and is dimensioned to fit the rear clip 302. The combination of the first channel member 428 and the second channel member 430 constrain the rear clip 302 from lateral movement, and thereby constrains the platform 104 from lateral movement relative to the pedal body 400. The pedal body 400 may be a unitary metal structure, such as from casting aluminum, steel or some alloy, or may be a unitary polymer structure and may be molded. Other fabrication methods are also possible.

Figure 2A:
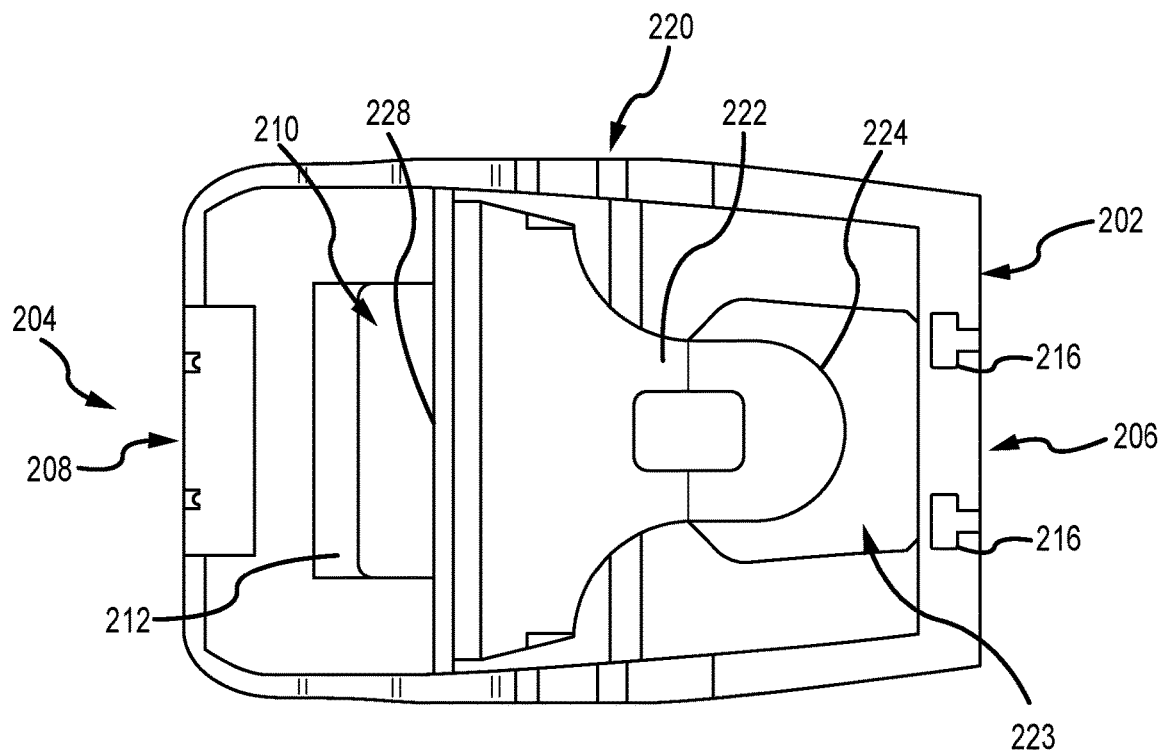
FIGS. 2A and 2B are a bottom and a bottom isometric view, respectively, of a pedal platform shown in FIG. 1.
Figure 2B:
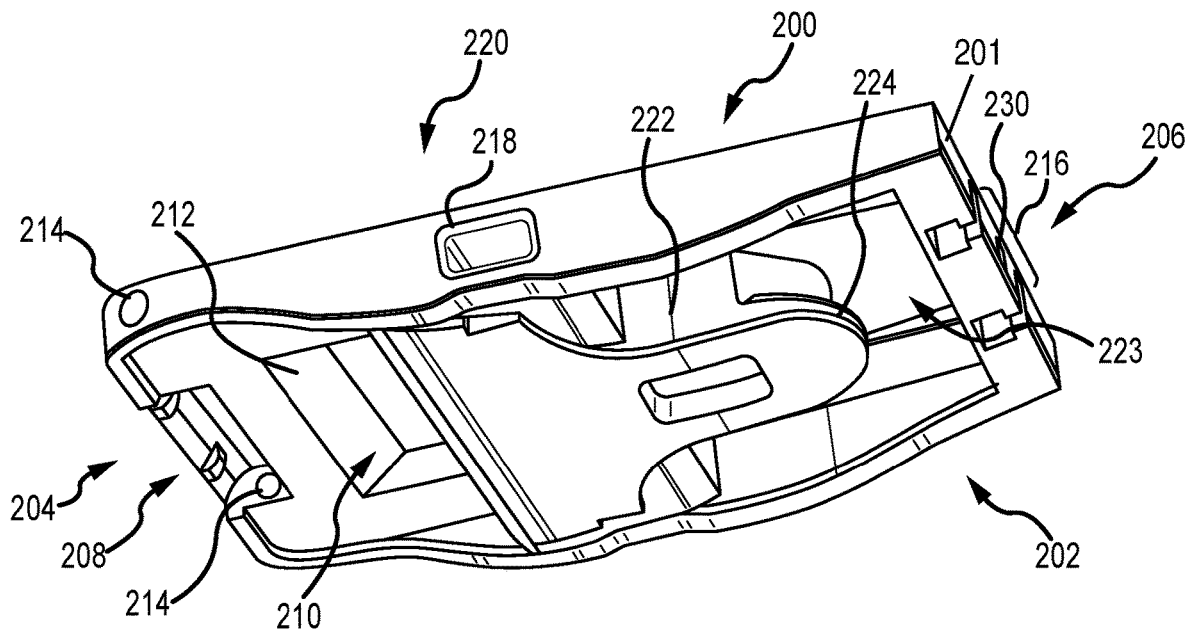

Turning to FIGS. 2A-2B, a bottom and a bottom isometric view, respectively, of the detachable shoe platform 104 of FIG. 1, are shown. The platform 104 includes a top side 200 and a bottom side 202, opposite the top side 200. In one example, the platform 104 is generally rectangular shaped with rounded edges at a first end 204 and sharp edges at a second end 206, although the platform 104 can be various other shapes such as oval, triangular, or square and can have rounded or sharp edges at any corner. The rider's shoe engages the platform 104 at a flat surface 226 on the top side 200, visible in FIG. 3A. The flat surface 226 may be textured to provide grip between the rider's shoe and the flat surface 226. The flat surface 226 includes a claw slot 210 extending through the bottom side 202 and positioned inwardly of the first end 204. The claw slot 210 is generally rectangular shaped and has a width, length, and depth sized to accommodate and receive the heel claw 412 when the platform 104 is secured to the pedal 102. The claw slot 210 receives the heel claw 412 so that the heel claw 412 does not jut into the platform 104 or otherwise push the platform 104 upwards, thereby enabling the flat surface 226 to be positioned close to the pedal 102, resulting in a low profile. The claw slot 210 also allows the platform 104 to be simply positioned on top of the pedal 102 without the need to remove any components or adjust the pedal 102. The flat surface 225 also includes a cleat opening 223 positioned near the second end 206. The cleat opening 223 provides access to a platform cleat 222 extending away from the bottom side 202. The platform cleat 222 engages the front lip 410 of the pedal 102, similarly to the cleat of the shoe, to partially engage and align the platform 104 to the pedal 102 during installation. During installation, the cleat opening 223 allows the rider to visually see where the platform cleat 222 is positioned with respect to the front lip 410 of the pedal 102 and may help the rider to properly align the platform cleat 222 with the front lip 410.

Still referring to FIGS. 2A-2B, the bottom side 202 includes a clip channel 208 formed at the first end 204 of the platform 104. The platform 104 further includes a pair of apertures 214 positioned on either side of the clip channel 208 that open into the clip channel 208. The pair of apertures receive a clip axle 320, which couples a rear clip assembly 300 to the platform 104. The platform 104 also includes a slot 218 extending through a center portion 220 of the platform 104. The slot 218 receives a strap 600 of the adjustable toe clip 106. The platform 104 may be a unitary metal structure, such as from casting aluminum, steel or some alloy, or may be a unitary polymer structure and may be molded. Other fabrication methods are also possible.

Referring to FIGS. 3A-3B, an exploded view of the rear clip assembly 300 with a first embodiment of the rear clip 302 and an exploded view of a second embodiment of the rear clip 302, respectively, are shown. The rear clip assembly 300 secures and locks the platform 104 to the pedal 102. The rear clip assembly 300, shown in FIGS. 1, 3A, 4A-D, and 5, extends downwardly from the first end 204 of the platform 104. The rear clip assembly 300 includes the rear clip 302, which has a generally rectangular body. The rear clip 302 defines a width in the long side to fit within the channel 426 of the pedal 102 and with little separation between the rear clip 302 and the opposing first channel member 428 and the second channel member 430. The rear clip 302 also defines a depth, along the short side, so that a rear surface 316 of the rear clip 302 is slightly spaced away and projected from a first and a second rear surface 432, 434 of the first and the second channel members 428, 430, respectively, as shown in FIG. 4D, which may help the rider to find the rear clip 302 as the rider is likely to touch the protruding rear clip 302 before the first or the second channel members 428, 430.

Referring to FIG. 3A and FIG. 5, the rear clip 302 includes a forwardly projecting hook portion 304 at a mid-section 306 of the rear clip 302. The hook portion 304 locks the platform 104 to the pedal 102 at the cross member 422 and an upper surface 305 of the hook portion 304 contacts the cross member 422 at the lower surface 423. The hook portion 304 prevents the platform 104 from moving upwards and off of the pedal 102 when the hook portion 304 is engaged with the cross member 422. The hook lip 314 extends upwardly from the hook portion 304 and provides a slight lateral lock, which requires some force to overcome and prevents small forces, e.g., vibrations during pedaling, from unlocking the rear clip 302 from the cross member 422.

Referring to FIG. 3A, the rear clip 302 also includes a pair of tabs 310, each with an aperture 318, and positioned at an upper portion 312. The pair of tabs 310, combined with a clip axle 320, couple the rear clip 302 to the platform 104. In more detail, each aperture 318 aligns with each of the pair of apertures 214 of the platform 104 when the pair of tabs 310 are positioned in the clip channel 208. The clip axle 320 extends through the pair of apertures 318 of the rear clip 302 and the pair of apertures 214 of the platform 104 and is generally parallel to the pedal axle 424 and the claw axle 416. A fastener 322, such as a cap, is fastened to the clip axle 320 by adhesion, a press fit, or the like, to secure the clip axle 320 to the platform 104, thereby securing the rear clip 302 to the platform 104. The clip axle 320 additionally allows the rear clip 302 to pivot with respect to the platform 104 during installation and removal of the platform 104 to and from the pedal 102.

The rear clip 302 is further spring-loaded so that if a force is applied to pivot the rear clip 302 rearwardly, away from the pedal 102, about the clip axle 320, the rear clip 302 will pivot forwardly, when the force is removed. When the rear clip 302 is being depressed downwardly in the channel 426, the rear clip 302 is biased against the spring force rearwardly. When the clip hook 304 extends below the cross member 422 of the pedal 102, the spring force moves the rear clip 302 into place to engage the cross member 422. In some instances, the rear clip 302 may also be pressed to snap it over the cross member 422. Thus, the rear clip 302 may lock the platform 104 to the pedal 102. In the example shown in FIG. 3A, a torsion spring 324 is secured around the clip axle 320 and engages the rear clip 302 to provide the return force.

In another embodiment, shown in FIG. 3B, the rear clip 302 is secured to the platform by way of a leaf spring portion 326 and bracket 328. The rear clip 302 includes the leaf spring 326 at the upper portion 312 of the rear clip 302, instead of the clip axle 320 and torsion spring 324. The leaf spring portion 326 is positioned in the clip channel 208 between the platform 104 and the bracket 328. The bracket 328 is fastened to the platform 104 at both ends by a pair of fasteners 330, which may be a pair of screws, for example. Because the leaf spring portion 326 is captured in the clip channel 208 by the bracket 328, the rear clip 302 can pivot about the leaf spring portion 326. The leaf spring portion 326 also biases the rear clip 302 in a forward orientation and requires some force to displace the rear clip 302 rearwardly when pressing the platform 104 onto the pedal 102. In one example, the rear clip 302 may be a molded plastic or metal piece separate from the leaf spring portion 326, and in another example, the rear clip 302 and leaf spring portion 326 may be an integrated unitary member.

The illustrated examples show the rear clip 302 at the rear of the platform 104 to engage the channel 426 of the pedal 102. Various alternatives, however, are possible. For example, the platform 104 may include opposing clips, at either side of the platform 104, with the pedal 102 defining opposing slots or channels to receive the clips. The clips may be similarly spring-loaded. Similarly, the various described embodiments describe spring-loaded clips; however, it is possible to define clips that pivot and are simply configured to snap into place without a spring mechanism. In such an example, the rider would depress the clip or clips to snap into a retaining structure. The rider would then have to unsnap the clip or clips. In another alternative, the clip may include a virtual pivot rather than a mechanical pivot by way of an axle.

Figure 4B:
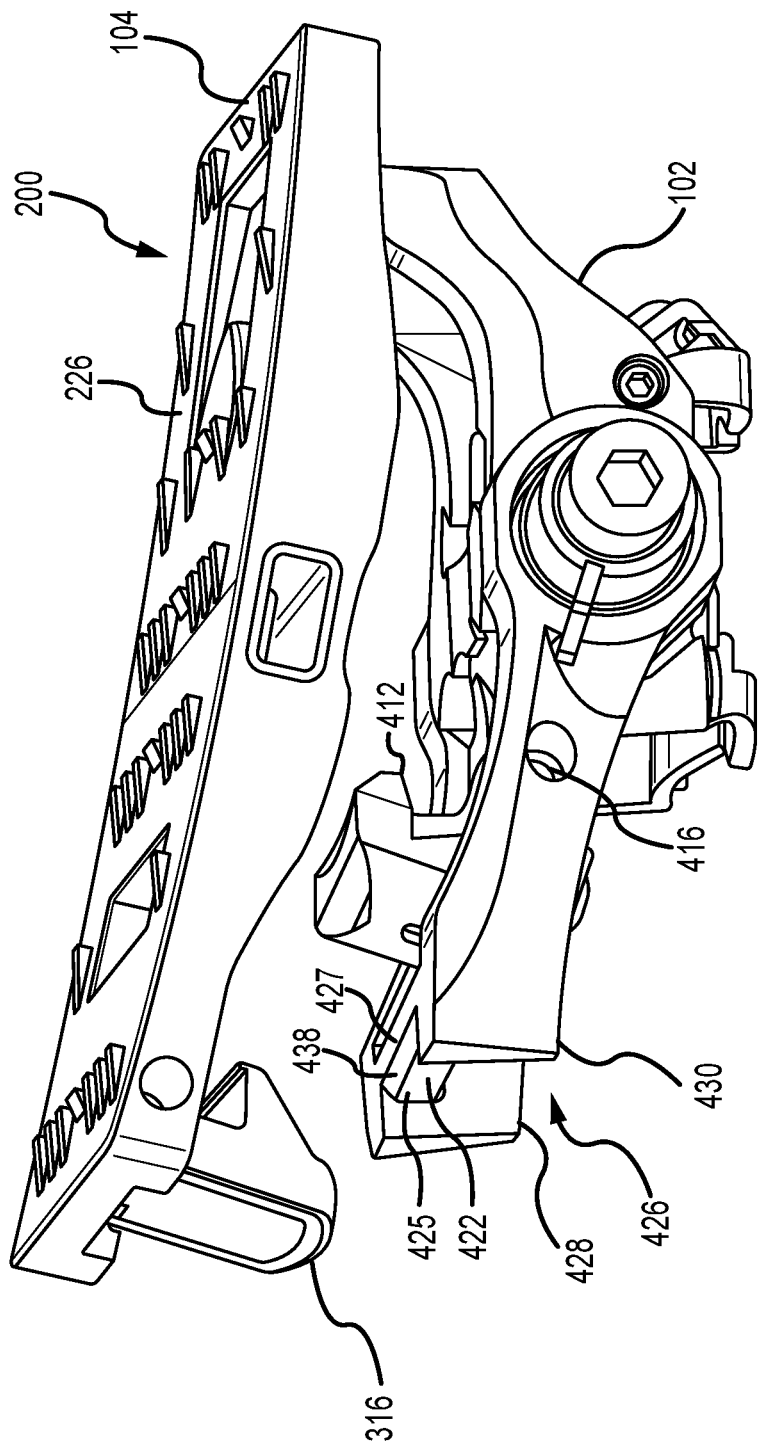
FIG. 4B is an isometric view of the pedal assembly of FIG. 4A, with a cleat of the platform inserted under a lip of the pedal, the platform in an initial orientation involved in locking the platform to the pedal.
Figure 4C:
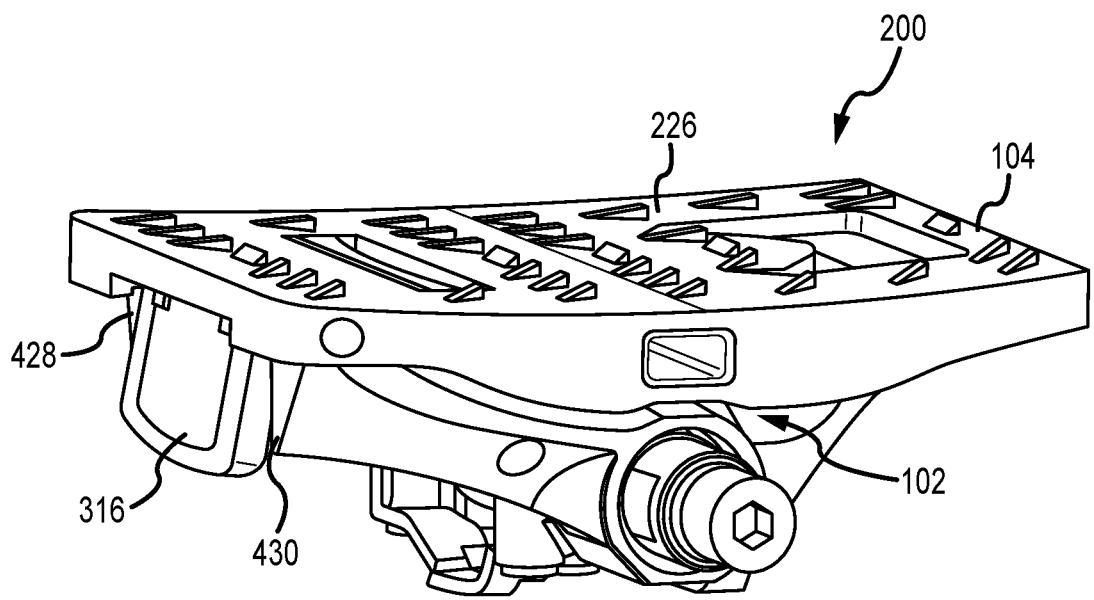
FIG. 4C is an isometric view of the pedal assembly of FIG. 4B, with a rear clip of the platform confined within a channel of the pedal but prior to locking the rear clip under a cross member of the pedal.
Figure 4D:
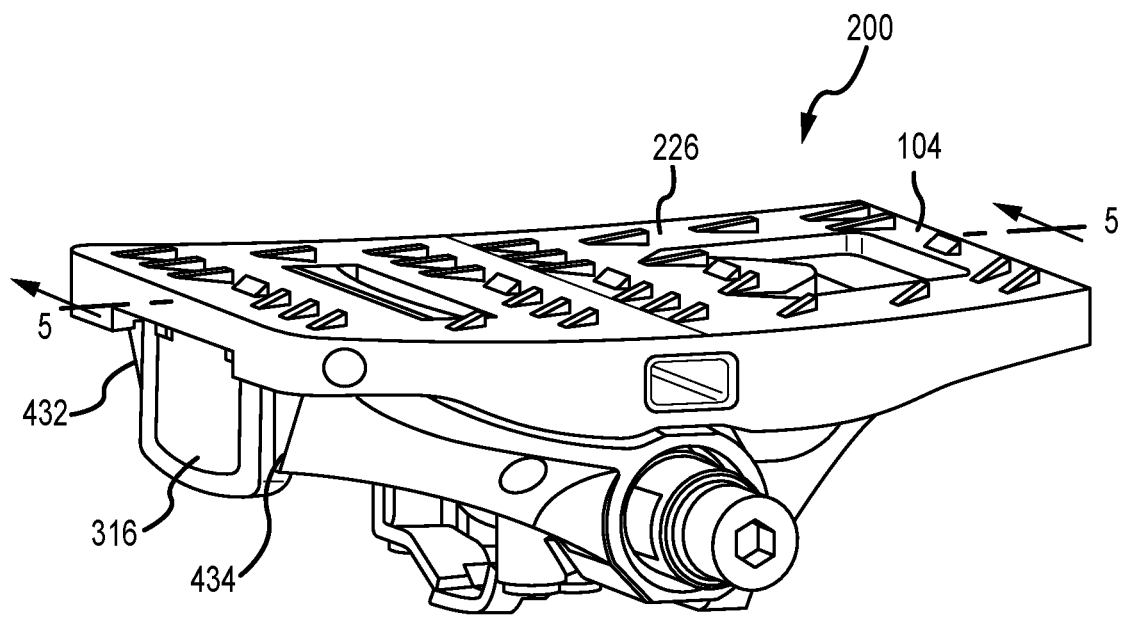
FIG. 4D is an isometric view of the pedal assembly of FIG. 4C, with the rear clip locked under the cross member and with the platform locked onto the pedal.

Turning to FIGS. 4A-4D, a sequence of views of the platform 104 being connected to the pedal 102 is illustrated. FIG. 4A illustrates the platform 104 above the pedal 102 prior to securing the platform 104 to the pedal 102. Referring now to FIG. 4B, the platform 104 engages the front lip 410 of the pedal 102, visible in FIG. 5, in a similar manner that the cleat of a rider's shoe engages the front lip 410 of the pedal 102. More specifically, the platform 104 is positioned so that the platform cleat 222 is adjacent to the front lip 410 and a locking lip 224 of the platform cleat 222 is under the front lip 410 of the pedal 102, where the locking lip 224 hooks the platform cleat 222 to the pedal 102 so that the platform 104 can be pivoted down onto the pedal 102. The platform cleat 222 and the front lip 410 act as an aligner for the platform 104 to the pedal 102 as the platform 104 is substantially aligned with the pedal 102 when the platform cleat 222 is positioned in the front lip 410. As can be seen in FIGS. 4B and 3A-3B, the heel claw 412 is received into the claw slot 210, which may also align the platform 104 as it is pressed onto the pedal 102. The claw slot 210, as previously described, is dimensioned to fit the heel claw 412.

In another example not illustrated, there may be any number of guiding and locating structures integrated such as the platform 104 may include two projections rearward of the platform cleat 222, and to either side of the platform cleat 222. The pedal body 400 may define corresponding apertures, in the form of slots, which are aligned with the projections when the platform is properly positioned and the cleat properly inserted under the lip. As the platform 104 is pressed down onto the pedal 102, the projections insert into the corresponding apertures to properly center the platform on the pedal. The projections may be shaped, such as with one or more ramped surfaces, so that the projections will fit down into the slots even if the platform 104 is slightly misaligned, and as the platform 104 is pressed down, the projections act to center the platform 104 on the pedal 102.

Turning to FIGS. 4C-4D, the platform 104 is illustrated flat against the pedal body 400 but with the rear clip 302 not yet engaged and with the rear clip 302 engaged, respectively. The heel claw 412, visible in FIG. 5, is positioned in the claw slot 210, which, as previously described, allows the platform 104 to be positioned close to the pedal 102, giving the pedal the low profile. As shown in FIG. 4C, the rear clip 302 is positioned within the channel 426 and partially between the first and second channel members 428, 430, but pivoted rearwardly, away from the pedal 102. The cross member 422 includes the rear surface 425, shown in FIGS. 4A and 5, that the hook portion 304 presses against, which pivots the rear clip 302 away from the pedal 102. As the platform 104 is pressed down onto the pedal 102, the hook portion 304 continues to slide down the rear surface 425 until the hook portion 304 is below the cross member 422. The spring 324 may then draw the rear clip 302 towards the inner surface 436 of the cross member 422 when the hook portion 304 is below the cross member 422. In another embodiment, where the rear clip 302 is not spring-loaded, the rider may press the rear clip 302 into position. FIG. 4D illustrates the rear clip 302 locked under the cross member 422 and the platform 104 fully secured to the pedal 102.

In one possible embodiment, the top of the pedal 102, the bottom of the platform 104, or both may include one or more compressible members, such as a compressible member along the lower surface 423 of the cross member 422. By pressing the platform 104 down onto the pedal 102, the hook portion 304 contacts the compressible member and the spring force compresses the compressible member. The hook portion 304 may then extend downward sufficiently to snap under the cross member 422 or the rider can provide additional force to snap the hook portion 304 under the cross member 422. The decompression of the compressible member, which will press the platform 104 away from the pedal 102 slightly, may provide some additional force to retain the hook portion 304 against the cross member 422.

FIG. 5 is a section view of the pedal assembly 100 in the configuration of FIG. 4D. As can be seen, in the locked position, the locking lip 224 of the platform cleat 222 is under the front lip 410 at the front of the pedal 102. Further, the rear clip 302 is flush against the cross member 422 and within the channel 426, the hook portion 304 is under the cross member 422, and the hook lip 314 is flush against an inner surface 436 of the cross member 422, thereby locking the rear clip 302 to the cross member 422. As can be seen, the hook portion 304 defines a sloped surface 332 extending to the bottom portion 308 of the rear clip 302. As the platform 104 is secured onto the pedal 102, the sloped surface 332 may contact the top, rearward surface 438 of the cross member 422 to pivot the rear clip 302 rearward to pivot the rear clip 302 against the cross member 422. As previously described, as the platform 104 is pushed down, the rear clip 302 slides down the lower surface 423 of the cross member 422, until the hook portion 304 clears the bottom of the cross member 422, where the spring force will lock the rear clip 302 onto the pedal 102 by pivoting forwardly so that the hook portion 304 is under the cross member 422.

Still referring to the section view, it can be seen that the heel claw 412 fits within the claw slot 210 in the bottom side 202 of the platform 104. In some cases, the combination of structures may be dimensioned so that the forward facing surface 414 of the heel claw 412 positively engages a face 228 of the claw slot 210 in the platform 104, with such positive engagement providing some tactile feedback when inserting the platform 104 down onto the pedal 102. The positive engagement can also provide additional force towards the platform cleat 222 and further pushing the platform cleat 222 under the front lip 410. In the embodiment illustrated, the heel claw 412 does not clamp over a flange or the like as would be the case for a conventional shoe cleat. Rather, the heel claw 412 is received in the claw slot 210 but does not engage a flange or other surface to provide a retaining force that would have to be overcome to lift the platform 104 off the pedal 102, notwithstanding the minor force from the claw 412 abutting the face 228 of the claw slot 210 in which it is received.

To release the platform 104 from the pedal 102, the rider reaches under the rear clip 302, where the rider may engage a downward facing surface 334 of the rear clip 302 at the hook portion 304 or the sloped surface 332, and pivots the rear clip 302 outward from the cross member 422 to unlock the platform 104 from the pedal 102. The downward facing surface 334 can be textured (e.g., knurling), which can help the rider to locate and engage the rear clip 302 as the downward facing surface 334 will have a different texture than surrounding surfaces. The texture can also provide grip to the rider. The platform 104 at or near the rear clip 302 is then pulled upwards and pivots upwardly about the front lip 410 of the pedal 102. While the platform 104 is pivoting, the face 228 of the claw slot 210 pushes the forward facing surface 414 of the heel claw 412, thereby pivoting the heel claw 412 rearwardly. A sloped surface 212 of the claw slot 210 receiving the claw provides space for the heel claw 412 to smoothly pivot rearwardly as the platform 104 is pivoted upwardly to disengage it from the pedal 102. The platform 104 is pivoted until the platform cleat 222 is released from the front lip 410, thereby fully releasing the platform 104 from the pedal 102.

The platform 104 allows the pedal 102 to be used with conventional shoes. Further, the platform 104 may include the adjustable toe clip 106, as shown in FIG. 1, which can be used to secure the rider's foot to the pedal when using conventional shoes. Although the illustrated toe clip 106 is shown with the platform 104, the toe clip 106 can be used with a pedal without the platform, a pedal with only one clipless structure, a pedal with no clipless structures, or any other type of pedal or base.

As can be seen in FIG. 1, the toe clip 106 is generally U-shaped and connected to a front face 201 of the platform 104, visible in FIG. 2B. Turning to FIGS. 6A-6C, an exploded view of the adjustable toe clip 106 without the strap 600, a detailed view of a plate 700, and a top view of a cover 618 are shown, respectively. As shown in FIGS. 1 and 6A, the toe clip 106 extends forward from the platform 104, then curves upwards through a curved portion 604, and extends back over the platform 104 to an upper portion 606 to define the U-shape. The toe clip 106 captures the toe area of the rider's shoe. The upper portion 606 is substantially parallel to the platform 104 but is somewhat flexible so that it can expand upwards to accommodate a large shoe or angle downwards to tighten over a small shoe. The general U-shape of the toe clip 106 allows for shoes of various widths and sizes to fit within the toe clip 106 as the toe clip 106 can expand or contract to fit various shoe sizes. The toe clip 106 also includes an opening 612 in the curved portion 604, which allows various shoe toe sizes or shapes to partially fit through the opening 612 for improved fit of the toe clip 106 onto the front portion of the shoe.

The strap 600, as shown in FIGS. 1, 7A-B, and 8, is used to further secure the shoe to the pedal 102. The strap 600 also prevents lateral movement of the rider's shoe on the platform 104.

Referring to FIG. 6A, the toe clip 106 includes a housing 614 formed at an end 616 of the upper portion 606 of the toe clip 106. The housing 614, in combination with the cover 618, houses the plate 700, a lever 742, a portion of the strap 600, and a portion of a trigger 746 to collectively define a strap fastener assembly 602. The cover 618 is fastened to the housing 614 via screws 632. The cover 618 defines a second column 796, which the strap 600 is secured to during use. The cover 618 also includes a plurality of housing tabs 793, shown in FIG. 6C, which are sized to fit in a plurality of tab receivers 795 on the housing 614. The plurality of housing tabs 793 define a cover first slot 792, a cover second slot 794, and a cover third slot 798, which receive the strap 600 during assembly and use.

Although the housing 614 is illustrated as an integrated portion of the toe clip 106, the housing 614 can also be a separate component and fastened or adhered to the toe clip 106. The housing 614 includes a first housing slot 620 disposed in a first end 622 and a second housing slot 624 disposed in a second end 626, opposite the first end 622. The first housing slot 620 and the second housing slot 624 receive the ends of the plate 700 to hold the plate 700 in the housing 614. A first opening 628 and a second opening 630 are positioned adjacent to the first housing slot 620 and the second housing slot 624, and respectively receive the strap 600.

Referring to FIG. 6B, the strap fastener assembly 602 includes the plate 700, which has a generally rectangular body 702 with a first end 704 and a second end 706, opposite the first end 704. A first extension 708 and a second extension 710 extend at an angle away from the body 702 at the first end 704 and the second end 706, respectively. The first extension 708 and the second extension 710 are received into the first housing slot 620 and the second housing slot 624, respectively, to couple the plate 700 to the housing 614. The first extension 708 includes a plate first slot 712 and a plate second slot 714, below the plate first slot 712. The plate first slot 712 and the plate second slot 714 capture a first end portion 786 of the strap 600.

The body 702 includes a strap opening 716 at the second end 706, which receives the strap 600 and in combination with the second opening 630 of the housing 614, allows portions of the strap 600 to enter and exit the housing 614 when the strap 600 is adjusted. The plate 700 also includes a first pair of plate tabs 718 positioned on opposing sides of the strap opening 716. Each of the first pair of plate tabs 718 extends upward from the body 702 and includes an aperture 720 to receive a lever stop 722. In the illustrated example, the lever stop 722 is a rod. In other examples, the lever stop 722 can be a ledge, bracket, or formed as one unit with the first pair of plate tabs 718. The lever stop 722 prevents the lever 742 from pivoting into the second opening 630 of the housing 614.

The body 702 includes a second pair of plate tabs having a housing tab 726 and a lever tab 728. The second pair of plate tabs 726, 728 are positioned adjacent to the strap opening 716, spaced from the first pair of tabs 718, and extend upward from the plate body 702. The housing tab 726 connects the plate 700 to the housing 614 and also, together with the lever tab 728, couples the lever 742 to the plate 700. The housing 614 includes a tab recess 797, visible in FIG. 6A, which is sized to receive the housing tab 726. The tab recess 797 can, together with the first housing slot 620 and the second housing slot 624, hold the plate 700 in position until the plate 700 is secured to the housing 614. In the illustrated example, the housing tab 726 has a plurality of apertures 730 having three apertures. Two of the apertures 730 align with two corresponding apertures 636 on the housing 614 and each receive a fastener 734, such as a screw, to fasten the plate 700 to the housing 614. A third aperture 730, together with an aperture 732 on the lever tab 728, receives a lever rod 740 to secure the lever 742 to the plate 700. As described in more detail below, the lever rod 740 pivotally couples the lever 742 to the plate 700.

Figure 7A:
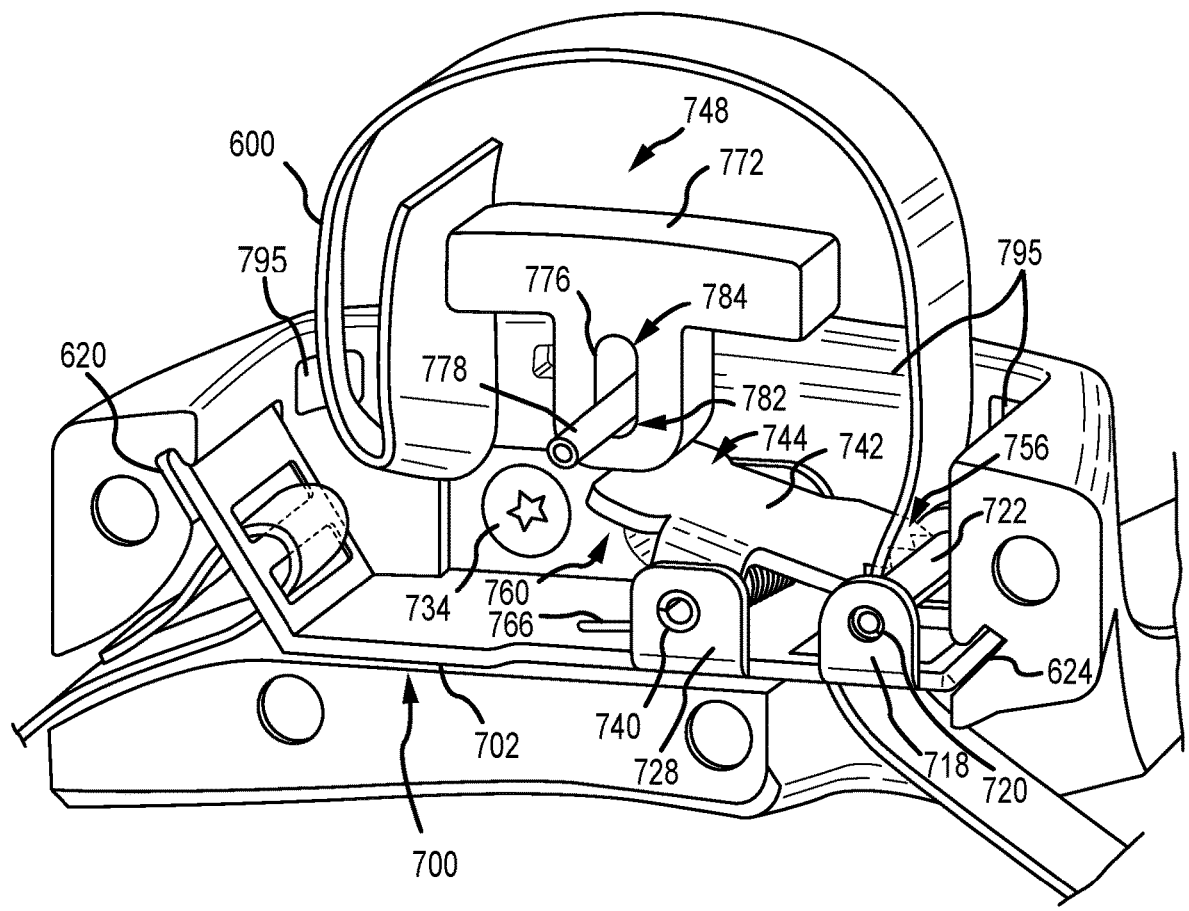
FIG. 7A is a rear tilted view of the adjustable toe clip of FIG. 6A with a lever in a closed position and a trigger in a first position.
Figure 7B:
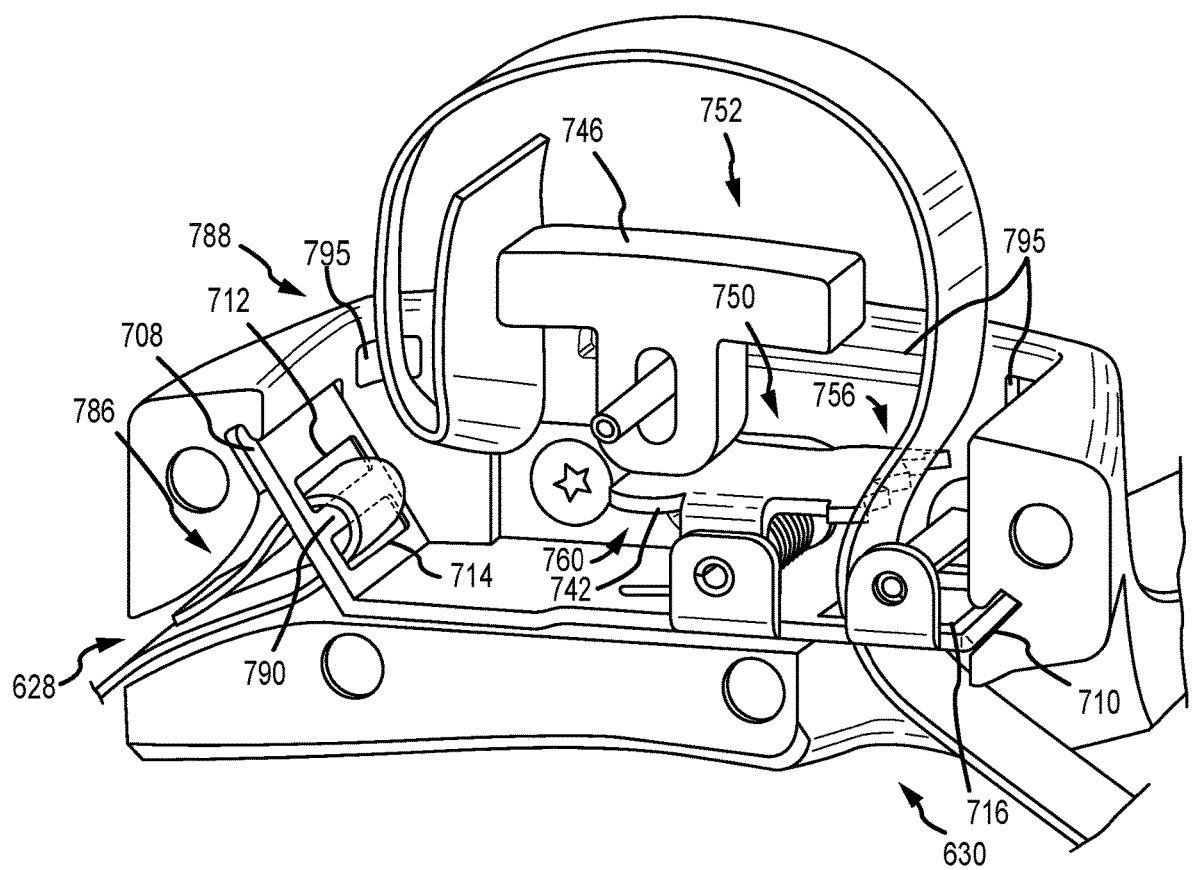
FIG. 7B is the same view of as FIG. 7A but with the lever in an open position and the trigger in a second position.

FIG. 7A is a rear isometric view of the toe clip 106 of FIG. 6 without the cover 618 and with the lever 742 in a closed position 744 and the trigger 746 in a first position 748 and FIG. 7B is another rear isometric view of the toe clip 106 of FIG. 6 without the cover 618 and with the lever 742 in an open position 750 and the trigger 746 in a second position 752. The lever 742, as shown in FIGS. 6A and 7A-7B, is generally rectangular shaped with a first end 756 having a serrated edge and a second end 760, opposite the first end 756, having a smooth edge. In another example, the lever 742 can include a smooth edge, serrated edge, or other type of textured edge on either or both the first end 756 and the second end 760. The first end 756 locks the strap 600 against the lever rod 740, whereas the second end 760 contacts the trigger 746 and transfers the force from the trigger 746 to the lever 742 when the rider presses down on the trigger 746. The serrated edge of the first end 756 may provide a high friction grip between the lever 742 and the strap 600 due to multiple points of contact of the serrated edge.

A pair of tabs 762 extends downwardly on opposing sides of the lever 742. Each of the pair of tabs 762 includes an aperture 764, which align with the aperture 732 of the lever tab 728 and one of the plurality of apertures 730 of the housing tab 726. The lever rod 740 extends through the apertures 764 of the pair of tabs 762 and the apertures 730, 732 of the second pair of plate tabs 726, 728, to pivotally secure the lever 742 to the plate 700. In the illustrated example, a torsion spring 766 is wrapped around the lever rod 740 and engages the second end 760 of the lever 742. The torsion spring 766 exerts a force against the second end 760, to push the second end 760 upwards, which biases the first end 756 downward toward the strap opening 716. The serrated edge of the first end 756 engages the lever stop 722, which prevents the lever 742 from pivoting into the strap opening 716. The second end 760 engages the trigger 746, which acts as an accessible connecter between the lever 742 and the rider, as the lever 742 is inaccessible after assembly.

The trigger 746 is generally T-shaped with an upper portion 768 and a lower portion 770. The upper portion 768 includes a large upper surface 772 for the rider to engage the trigger 746. The trigger 746 is also positioned above the strap fastener assembly 602 to provide access to the lever 742 to the rider, as the lever 742 is generally inaccessible within the housing 614. The lower portion 770 extends through an opening 774 of the cover, as shown in FIG. 1, and includes a trigger opening 776. The trigger opening 776 receives a trigger rod 778, which coupled to and extending from the housing 614. The trigger rod 778 translationally supports the trigger 746 in the housing 614. In the illustrated example, the trigger opening 776 is an elongated slot operable to prevent sideways lateral movement of the trigger 746 on the trigger rod 778, but allows upward or downward lateral movement within the trigger opening 776 to move the trigger 776 between the first position 748 and the second position 752. Alternatively, the trigger opening 776 can be any shape such as an elongated rectangle, triangular, trapezoidal, star shaped, or the like.

The trigger 746 includes a bottom surface 780 on the lower portion 770, which contacts and engages the second end 760 of the lever 742 and moves the lever 742 from the closed position 744 to the open position 750 when the trigger 746 is pushed down from the first position 748 to the second position 752. More specifically, when the trigger 746 is in the first position 748, the second end 760 of the lever 742 is biased upwards, thereby pushing the trigger 746 upwards and positioning the trigger rod 778 in a lower portion 782 of the trigger opening 776. When the trigger 746 receives a downward force, the trigger 746 is moved to the second position 752, wherein the trigger rod 778 moves into an upper portion 784 of the trigger opening 776. The downward force is transferred to the lever 742 and pivots the second end 760 of the lever 742 downward and the first end upward 756 into the open position 750, thereby releasing the strap 600 from the lever 742. The rider can adjust the strap when the lever 742 is in the open position 750 by pulling or pushing the strap 600 through the cover first slot 792. Typically, pulling the strap 600 up and out of the cover first slot 792 will tighten the strap 600 over the rider's shoe and pushing the strap 600 down and through the cover first slot 792 will loosen the strap 600. The strap 600 is locked in the desired length or position when the lever 742 is in the closed position 744.

Still referring to FIGS. 7A and 7B, the strap 600 is shown assembled in the housing 614. The strap 600 includes the first end portion 786 secured to the plate 700 and a second end portion 788 secured to the cover 618, visible in FIGS.

Figure 8:
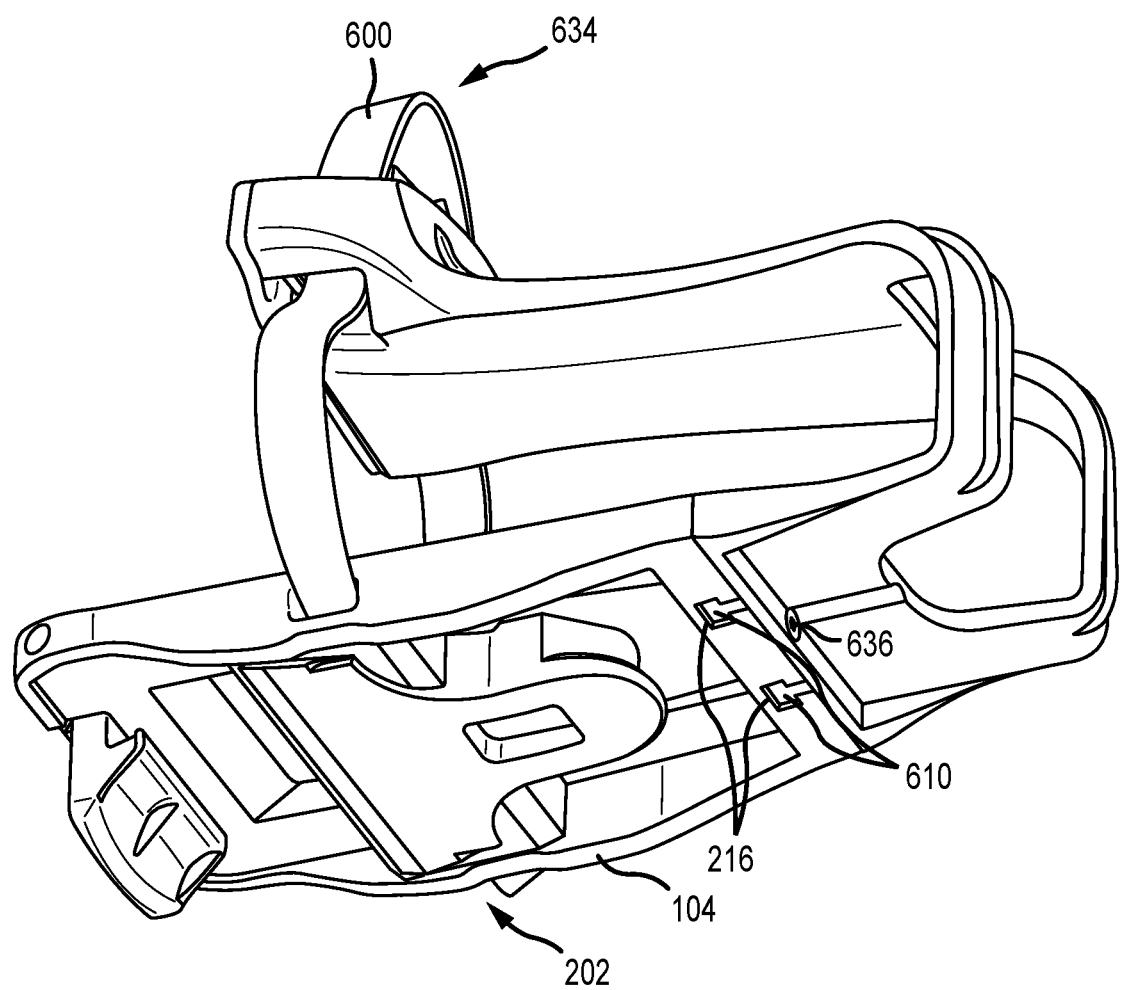
FIG. 8 is a bottom tilted view of the pedal assembly of FIG. 1, with the adjustable toe clip secured to the pedal platform.

1, 6, 7A-7B, and 8. The first end portion 786 of the strap 600 is received in the first opening 628 of the housing 614 the plate second slot 714 of the plate 700. The first end portion 786 is wrapped around a first column 790 disposed between the plate second slot 714 and the plate first slot 712, and received in the plate first slot 712 such that the first end portion 786 is doubled over itself. The first end portion 786 is fastened to itself by a rivet, screw, adhesion, or the like, thereby securing the first end portion 786 to the plate 700. Moving counterclockwise from the first end portion 786, the strap 600 is received through the slot 218 of the platform 107 as shown in FIGS. 1 and 8, through the second opening 630 of the housing 614, and the strap opening 716 of the plate 700. Here, the strap 600, as previously described in detail, is captured between the lever 742 and the lever rod 740 when the lever 742 is in the closed position 744. Continuing counterclockwise, the strap is received in a cover first slot 792. The strap 600 wraps over the trigger 746 and the second end portion 788 is received in a cover second slot 794. The second end portion 788 wraps around the second column 796 disposed between the cover second slot 794 and a cover third slot 798 and is received through the cover third slot 798 such that the second end portion 788 is doubled over itself. The second end portion 788 is fastened to itself by a rivet, screw, adhesion, or the like, thereby securing the first end to the cover 618. Securing the first end portion 786 and the second end portion 788 to the strap fastener assembly 602 advantageously allows the adjustable toe clip 106 to be self-contained, free of loose straps, and without risk of the strap coming free of the strap fastener assembly.

Turning to FIG. 8, a bottom tilted view of the adjustable toe clip 106 secured to the platform 104 is shown. In the illustrated example, a bottom portion 608, adjacent to the curved portion 604, of the toe clip includes a pair of connector tabs 610, which clip into a pair of tab receivers 216 to couple the toe clip 106 to the platform 104. As previously described, each of the pair of connector tabs 610 slides into the corresponding pair of tab receivers 216 on the platform 104, also shown in FIGS. 2A-2B. A connector fastener 637, such as a screw, passes through a connector aperture 638 of the toe clip 106, visible in FIG. 2B, and fastens or screws into the connector aperture 638 of the platform 104, thereby securing the toe clip 106 to the platform 104. Alternatively, the platform 104 and the toe clip 106 can be formed as a unitary member. Further, the toe clip 106 can be secured to or formed as a unitary member with a conventional platform pedal.

In use and referring to FIGS. 7A-7B, the rider positions the front portion of the rider's shoe in the toe clip 106 and pulls upwards on an adjustable portion 634 of the strap 600 disposed above the toe clip 106. The adjustable portion 634 forms a half loop or hook over the trigger 746, whereby the rider can hook a finger under the adjustable portion 634 and pull upwards on the strap 600 to tighten the strap 600. Further, the adjustable portion 634 is the highest point of the adjustable toe clip 106 and thus, closest to a rider's hand. The combination of the upward force on the strap 600 and the frictional contact between the first end 756 of the lever 742 and the strap 600 causes the first end 756 to pivot upwards, creating a gap between the lever 742 and the lever stop 722. The semi-open position 750 allows the strap 600 to continue to move upwards through the cover first slot 792 and increase the length of the adjustable portion 634, thereby tightening the strap 600 and toe clip 106 over the front portion of the rider's shoe. When the desired tightness of the strap 600 is achieved, the rider releases the adjustable portion 634, wherein the lever 742 returns to the biased closed position 744 and locks the strap 600. To release the strap 600, the rider pushes down on the trigger 746, which moves the trigger 746 from the first position 748 to the second position 752. In other words, the rider can push the trigger 746 down, which transfers the downward force to the lever 742 against the spring force and pivots the lever 742 from the biased closed position 744 to the open position 750, thereby releasing the strap 600. The rider can adjust the strap 600 by loosening or tightening the strap 600 while the trigger 746 is down. The rider can stop pressing the trigger 746, which releases spring force, which pivots the lever 742 from the open position 750 to the closed position 744, which causes the trigger 746 to move from the second position 752 to the first position 748. The rider can also easily reach the trigger 746 for adjustments as the trigger 746 is disposed below the adjustable portion 634 of the strap 600 and above the strap fastener assembly 602.

By providing a clipless structure on the first side, a different clipless structure on the second side, and a detachable platform combined with an adjustable toe clip, the pedal assembly can accommodate any type of shoes the rider may be wearing, thereby allowing the pedal to be used by any rider.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:
1. A pedal comprising:
a pedal body including a first clipless structure on a first side of the pedal body, the first clipless structure including a lip at a first portion of the pedal and a claw at a second portion of the pedal, the pedal body further including a member; and
a platform including a cleat portion and a clip, the cleat portion securable under the lip and the clip securable to the member to lock the platform to the pedal body, the lip and the member locking the platform to the pedal body by constraining movement of the platform in a direction away from the pedal body.
2. The pedal of claim 1, wherein the pedal body further includes a second clipless structure on a second side of the pedal body.
3. The pedal of claim 1, wherein the pedal body further includes a channel extending from the member, the channel dimensioned to receive the clip, whereby the platform is constrained from lateral movement relative to the pedal body by the clip secured within the channel and under the member.
4. The pedal of claim 3, wherein the claw is spaced between the lip and the channel, the channel opening away from the lip.
5. The pedal of claim 1, wherein the claw is spring-loaded, and wherein the platform further includes a claw slot dimensioned to receive the claw when the platform is locked to the pedal by the cleat portion secured under the lip and the clip secured to the member.

6. The pedal of claim 1, wherein the clip is spring-loaded to provide a spring-loaded force to lock the clip to the member.

7. The pedal of claim 6, wherein the platform further includes a rod pivotably securing the clip to the platform, and further includes a torsion spring coupled to the rod to provide the spring-loaded force to the clip.

8. The pedal of claim 6, wherein the platform further includes a leaf spring securing the clip to the platform, wherein the leaf spring is operable to provide the spring-loaded force.

9. The pedal of claim 1, wherein the clip further comprises a hook portion engaging the member when the clip is secured to the member.

10. The pedal of claim 9, wherein the hook portion defines a hook lip along an outer edge of the hook portion, the hook lip extending over an inner surface of the member when the hook portion is secured to the member.

11. The pedal of claim 10, wherein the clip further includes a bottom portion spaced angularly from the hook lip and a sloped surface extending between the hook lip and the bottom portion, wherein the sloped surface is engaged by the member during assembly of the platform to the pedal and engaged by a rider during disassembly of the platform from the pedal.

12. The pedal of claim 11, wherein the bottom portion of the clip includes a downward facing surface facing away from the pedal, and wherein the downward facing surface is engaged by a rider during disassembly of the platform from the pedal.

13. The pedal of claim 1, wherein the cleat portion is securable under the lip and the clip securable to the member to lock the platform to the pedal body by further constraining lateral movement of the platform relative to the pedal body.

14. An adjustable toe clip comprising:
a base;
a toe cage coupled to the base and operable to receive and capture a front portion of a shoe;
a strap extending between the base and a strap fastener assembly, the strap fastener assembly coupled to the toe cage, the strap fastener assembly comprising:
a housing,
a plate secured in a slot defined in the housing,
a first end portion of the strap secured to the plate, and
a lever coupled to the plate, the lever including a first end biased against the strap; and
a trigger translationally supported in the housing and positioned to engage the lever to move the lever from a closed position to an open position against the bias force, thereby releasing the strap for adjustment.

15. The adjustable toe clip of claim 14, wherein the strap forms an adjustable portion at an upper portion of the strap fastener assembly, wherein the adjustable portion is operable to receive an upward force, moving the adjustable portion upward and pivoting the lever against the bias force, thereby releasing the strap.

16. The adjustable toe clip of claim 14, wherein the trigger is coupled to the housing via a trigger rod extending from the housing, wherein the trigger rod is received in an opening of the trigger.

17. The adjustable toe clip of claim 16, wherein a first position corresponding to the closed position of the lever is defined by the trigger rod positioned in a lower portion of the opening and a second position corresponding to the open position of the lever is defined by the trigger rod positioned in an upper portion of the opening.

18. The adjustable toe clip of claim 14, wherein the lever is spring-loaded to provide the bias force.

19. The adjustable toe clip of claim 14, wherein the base is a platform defining a cleat removably receivable in a clipless structure of a pedal.

20. The adjustable toe clip of claim 14, wherein the toe cage includes an upper portion disposed above the base, and wherein the strap fastener assembly is coupled to the upper portion.

21. A pedal comprising:
a pedal assembly comprising:
a pedal body including a first clipless structure on a first side, the first clipless structure including a lip at a first portion of the pedal and a claw at a second portion of the pedal, the pedal body further including a member rearward of the claw; and
a platform including a cleat portion and a clip, the cleat portion securable under the lip and the clip securable to the member to lock the platform to the pedal body by constraining vertical movement of the platform relative to the pedal body; and
an adjustable toe clip coupled to the pedal assembly, the adjustable toe clip comprising:
a toe cage operable to receive and capture a front portion of a shoe;
a strap extending between the platform and a strap fastener assembly, the strap operable to wrap around the shoe; and
the strap fastener assembly coupled to the toe cage, the strap fastener assembly having a lever coupled to a plate secured in a housing, the lever having a first end biased against the strap and a second end engaged by a trigger, the trigger operable to move the lever from a closed position to an open position against the bias force thereby releasing the strap for adjustment.

22. The pedal of claim 21, wherein the pedal body includes a second clipless structure on a second side of the pedal body.

23. The pedal of claim 21, wherein the platform further includes a rod pivotably securing the clip to the platform, and further includes a torsion spring coupled to the rod to provide a spring-loaded force to secure the clip to the member.

24. The pedal of claim 21, wherein the strap forms an adjustable portion at an upper portion of the strap fastener assembly, wherein the adjustable portion is operable to receive an upward force, moving the adjustable portion upward and pivoting the lever against the bias force thereby releasing the strap.

* * * * *